US012264539B2

United States Patent
Fernando et al.

(10) Patent No.: US 12,264,539 B2
(45) Date of Patent: Apr. 1, 2025

(54) GUIDE CLOSING MECHANISM FOR FIRE SHUTTERS

(71) Applicant: CornellCookson, LLC, Mountain Top, PA (US)

(72) Inventors: Brian Rishi Kachchakaduge Fernando, Avondale, AZ (US); Christopher John Rebarchak, White Haven, PA (US); John Elias Bullen, Phoenix, AZ (US)

(73) Assignee: CornellCookson, LLC, Mountain Top, PA (US)

( * ) Notice: Subject to any disclaimer, the term of this patent is extended or adjusted under 35 U.S.C. 154(b) by 683 days.

(21) Appl. No.: 17/545,570

(22) Filed: Dec. 8, 2021

(65) Prior Publication Data
US 2023/0175551 A1 Jun. 8, 2023

(51) Int. Cl.
| | |
|---|---|
| *E06B 9/58* | (2006.01) |
| *A62C 2/10* | (2006.01) |
| *A62C 2/18* | (2006.01) |
| *F16C 29/02* | (2006.01) |
| *E06B 9/15* | (2006.01) |

(52) U.S. Cl.
CPC ............... *E06B 9/581* (2013.01); *A62C 2/10* (2013.01); *A62C 2/18* (2013.01); *F16C 29/02* (2013.01); *E06B 2009/1577* (2013.01)

(58) Field of Classification Search
CPC .... A62C 2/10; A62C 2/18; E06B 9/58; E06B 9/851; E06B 2009/1577; F16C 29/02
See application file for complete search history.

(56) References Cited

U.S. PATENT DOCUMENTS

| | | | | |
|---|---|---|---|---|
| 4,453,584 | A | * | 6/1984 | Steele ..................... E06B 9/24 428/178 |
| 4,467,853 | A | * | 8/1984 | Downey, Jr. ............ E06B 9/581 160/133 |
| 5,058,651 | A | * | 10/1991 | Ashley .................... E06B 9/581 160/271 |
| 5,117,892 | A | * | 6/1992 | Murray ................... E06B 9/582 160/269 |
| 5,379,823 | A | * | 1/1995 | Kraeutler ............... E06B 9/0692 160/84.06 |
| 5,392,835 | A | * | 2/1995 | Wildt .................. E06B 9/17076 160/269 |
| 6,959,751 | B2 | | 11/2005 | Savard et al. |

(Continued)

FOREIGN PATENT DOCUMENTS

| | | |
|---|---|---|
| DE | 10 2018 133137 A1 | 6/2020 |
| EP | 1491712 A2 | 12/2004 |
| WO | 2018138277 A1 | 8/2018 |

OTHER PUBLICATIONS

International Search Report and Written Opinion mailed on Apr. 5, 2023 in corresponding PCT Application No. PCT/US2022/051130, 17 pages.

*Primary Examiner* — Johnnie A. Shablack

(57) ABSTRACT

In example implementations, a guide member is provided. The guide member includes a first portion to receive a first fastener to a second guide member to form a guide assembly having a gap, wherein an endlock of a fire shutter is positioned within the gap, a second portion to receive a second fastener to a wall, a third portion folded against the second portion, a fourth portion bent at 90-degrees or greater to the third portion.

19 Claims, 4 Drawing Sheets

(56) References Cited

U.S. PATENT DOCUMENTS

| | | | |
|---|---|---|---|
| 7,464,743 B1* | 12/2008 | Berger, Jr. | E06B 9/581 |
| | | | 160/133 |
| 8,905,113 B2 | 12/2014 | Daus et al. | |
| 9,127,501 B1* | 9/2015 | Stobich | E04B 1/942 |
| 9,187,953 B2* | 11/2015 | Drifka | E06B 9/58 |
| 9,217,284 B2 | 12/2015 | Panseri et al. | |
| 10,221,561 B2* | 3/2019 | Siller | E04B 1/947 |
| 10,794,116 B2* | 10/2020 | Kanuri | E06B 9/88 |
| 11,952,836 B2* | 4/2024 | Lai | E06B 9/17076 |
| 2013/0306252 A1* | 11/2013 | Lambridis | E06B 9/582 |
| | | | 160/133 |
| 2016/0376841 A1* | 12/2016 | Hentschel | E06B 9/581 |
| | | | 160/270 |
| 2017/0356239 A1 | 12/2017 | Ouyang et al. | |
| 2019/0178032 A1 | 6/2019 | McNabb et al. | |
| 2021/0131180 A1 | 5/2021 | Jones | |
| 2024/0001180 A1* | 1/2024 | Wright | A62C 2/10 |

\* cited by examiner

GUIDE CLOSING MECHANISM FOR FIRE SHUTTERS

BACKGROUND

Many locations may have openings in walls that may be closed by a rolling door or fire shutter. Some of the openings may include counters to interact with customers. The counters may be located at stadiums, office buildings, kiosks, cafeterias, shopping areas, boardwalks, and the like. Rolling shutters may be installed over these openings to seal the openings. The rolling shutters may be comprised of multiple panels that can be rolled up and down along a guide to open and close the shutter.

One type of rolling shutter is a fire shutter. In the event of a fire, fire shutters are used as a structural barrier to compartmentalize the building and prevent the spread of fire. A fire shutter may be designed to withstand the heat and pressure generated from a fire. The fire shutter may thermally expand and bow due to the heat and pressure generated by the fire. But the fire shutter may be designed to remain in the guide assembly. Also, under extreme wind loads the fire shutter may also experience bowing due to the wind loads, which also requires that the fire shutter be designed to remain in the guide assembly.

DETAILED DESCRIPTION

Examples described herein provide an improved guide closing mechanism for fire shutters. As discussed above, a fire shutter may be designed to withstand the heat expansion and pressure generated from a fire. The fire shutter may thermally expand and bow due to the heat expansion and pressure generated by the fire. But the guide assembly is designed to retain the fire shutter in the guide assembly under such conditions. Similarly, at extreme wind loads when the fire shutter curtain exerts force on the guide, the guide assembly is designed to retain the fire shutter in the guide assembly.

For example, previous designs used a single point of contact against an endlock of the fire shutter. The guide would have a single contact point to interlock against the endlock. The single contact point between the guide and the endlock is not an optimized structure to retain the endlock within the guide during fire events or extreme wind load events.

The present disclosure provides an improved guide closing mechanism/assembly that can keep the endlock in the guide assembly during a fire. In addition, the improved guide assembly provides greater constricting force against the endlock during a fire, while maintaining a relatively small profile.

In an embodiment, the improved guide assembly may include a guide assembly that includes multiple bends. One of the bends in the guide assembly may be approximately 180 degrees. An end of the guide assembly may be bent at approximately 90 degrees. Two halves of the guide assembly may be coupled together such that the ends that are bent at approximately 90 degrees are facing each other.

The bend that is approximately 180 degrees may store a large amount of internal stress. As a result, when exposed to heat from a fire, the internal stress may be released or relaxed to allow the portion of the guide that is bent approximately 180 degrees to move towards the endlock. As the bend that is approximately 180 degrees of each guide is released, the opposing ends of the guides may close the gap between the guides and apply a constrictive force against the endlock.

Figure 1:
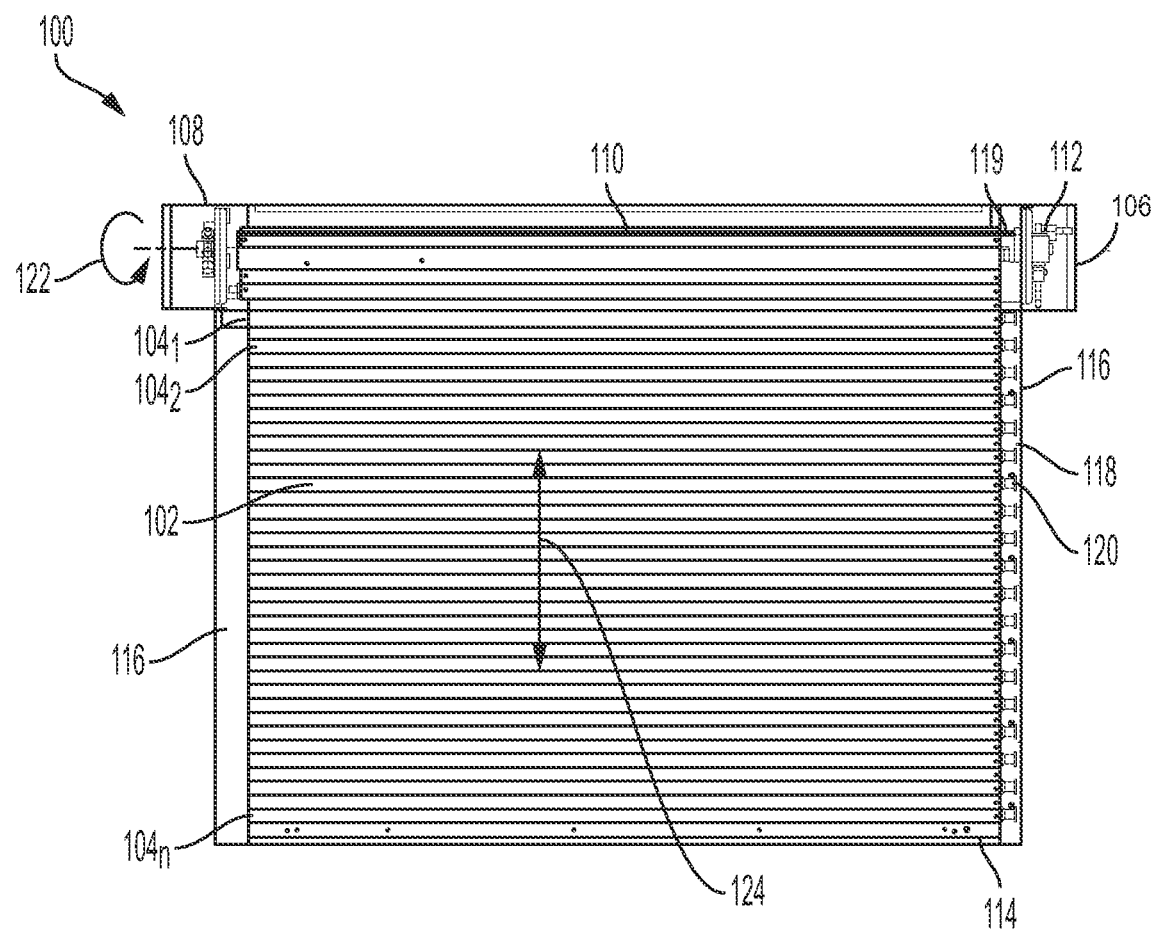
FIG. 1 illustrates a block diagram of a fire shutter of the present disclosure.

FIG. 1 illustrates an example fire shutter assembly 100 with improved guide assembly 118 of the present disclosure. The fire shutter assembly may include a fire shutter 102 that is comprised of a plurality of slats $104_1$ to $104_n$ (hereinafter also referred to individually as a slat 104 or collectively as slats 104). The fire shutter 102 may move vertically up and down as shown by the arrow 124. The fire shutter 102 may include a bottom bar 114 that rests against a counter surface or floor surface when the fire shutter 102 is in a closed position, as shown in FIG. 1.

In an example, the slats 104 may include endlocks 120 that may be located within the guide assembly 118. The slats 104 may be secured by the endlocks 120 located within the guide assembly 118. The guide assembly 118 may also guide movement of the slats 104 to open and close the fire shutter.

In an example, the fire shutter assembly 100 may include jambs 116 on opposite sides of the fire shutter 102. The guide assembly 118 may be located within the jambs 116. Thus, the fire shutter assembly 100 may include two guide assemblies 118 of the present disclosure on opposite sides of the fire shutter 102 and within the respective jambs 116. In other words, a first guide assembly 118 may be located in the jamb 116 on a first side of the fire shutter 102 and a second guide assembly may be located in the jamb 116 on a second side of the fire shutter 102.

In addition, each slat 104 may include two endlocks 120 on opposite ends of the slat 104. Thus, each slat 104 may be secured in the guide assemblies 118 by the endlocks 120 on opposite ends of the slat 104.

In an example, the fire shutter assembly 100 may include a head assembly 106. The head assembly 106 may include a barrel 110 (also referred to as a counter balance shaft) that can rotate around its axis 360 degrees as shown by an arrow 122. The fire shutter 102 may be wrapped concentrically around the barrel 110 as the fire shutter 102 is opened.

The head assembly 106 may also include an adjusting wheel 108, a governor assembly 119, a clutch assembly 112, and other components such as an intermediate sprocket, a main sprocket, an adjustor bracket, a fuse link chain assembly, and the like. Manual operators use an adjustable governor to determine a speed at which the clutch assembly 112 may close in case of a fire. The clutch assembly 112 may control how the fire shutter 102 is operated. For example, in normal operation, the clutch assembly 112 may engage a sprocket to allow manual opening and closing of the fire curtain 102. In case of a fire, the clutch assembly 112 may transfer control of the fire shutter 102 to the governor assembly 119, which may then close the fire shutter 102 at a rate determined by the friction brake and free spin in the governor assembly 119. Alternate known means for adjusting the speed a fire shutter 102 descending into a closed position may be utilized, such as viscosity governors or motors.

In case of a fire, the fire shutter 102 may be closed to compartmentalize the fire to a particular location and help prevent spread of the fire. The fire shutter 102 may come under high thermal loads and pressure (from heat or from wind loads). The guide assembly 118 of the present disclosure may be designed to improve the constraining force against the endlocks 120 of the slats 104. As a result, the fire shutter 102 may withstand greater thermal stresses and pressures to retain the fire shutter 102 within the guide assembly 118 and otherwise allow the fire shutter 102 to bow during such events.

Figure 2:
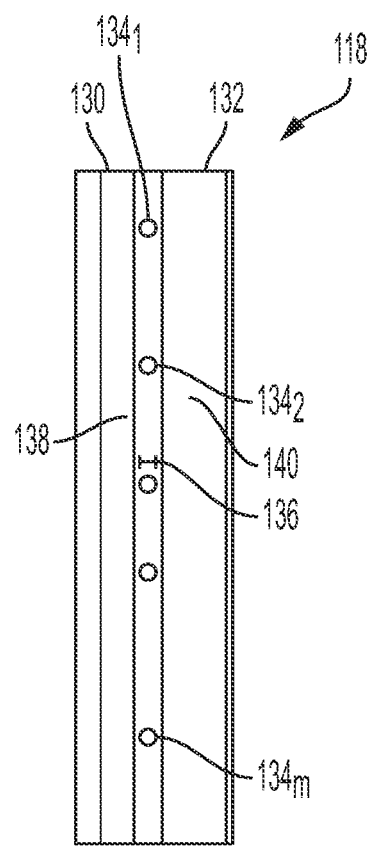
FIG. 2 is a block diagram of a front view of a guide assembly of the present disclosure.

FIG. 2 illustrates a block diagram of a front view of the guide assembly 118 of the present disclosure. In an example, the guide assembly 118 may include a first guide member 130 and a second guide member 132.

The first guide member 130 and the second guide member 132 may be coupled together via a fastener placed through openings $134_1$ to $134_m$ (hereinafter also referred to individually as an opening 134 or collectively as openings 134). A portion of the first guide member 130 with the openings 134 and a portion of the second guide member 132 with the openings 134 may be overlapped such that the openings 134 are aligned to couple the first guide member 130 and the second guide member 132 together.

Figure 4:
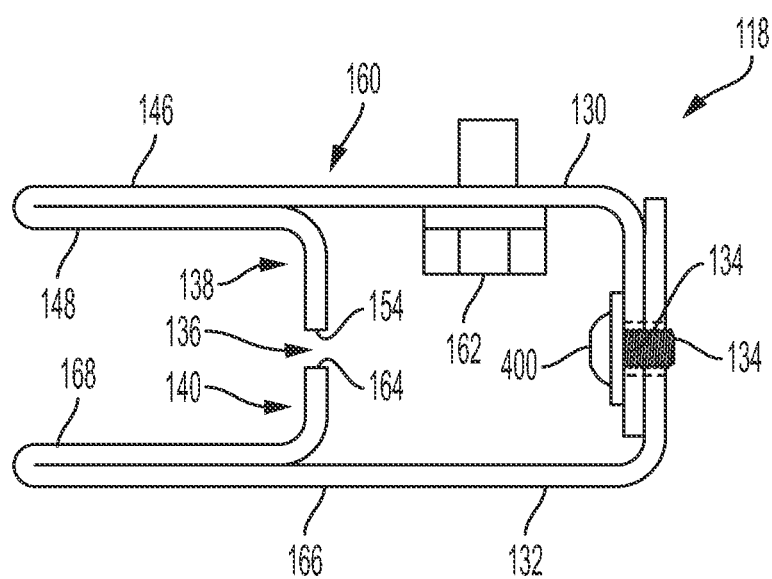
FIG. 4 is a block diagram of a top cross-sectional view of the guide assembly of the present disclosure.

FIG. 4 illustrates a top view that show an opening 134 of the first guide member 130 and an opening 134 of the second guide member 132. The openings 134 of the first guide member 130 and the second guide member 132 may be aligned to allow a fastener 400 to be fitted through the aligned openings 134. The first guide member 130 and the second guide member 132 may be coupled together via the fastener 400 that is fitted through the aligned openings 134 of the first guide member 130 and the second guide member 132.

Referring back to FIG. 2, in an example, the first guide member 130 may have a first guide member flange 138 (also referred to as flange 138). The second guide member 132 may have a second guide member flange 140 (also referred to as flange 140). The first guide member 130 and the second guide member 132 may be coupled together such that the ends of the flange 138 and the flange 140 are adjacent to one another. In addition, the first guide member 130 and the second guide member 132 may be coupled together such that a gap 136 may be formed between the ends of the flange 138 and the flange 140.

Figure 3:
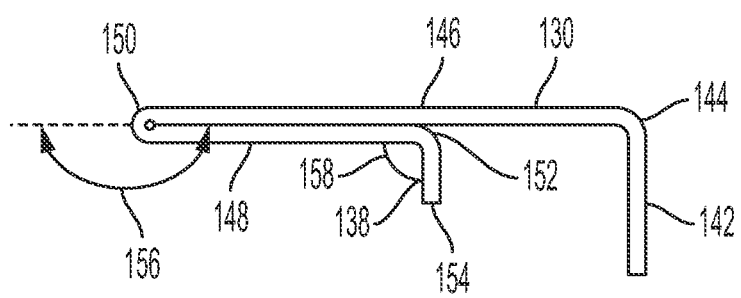
FIG. 3 is a block diagram of a top cross-sectional view of a single guide of the guide assembly of the present disclosure.

FIG. 3 illustrates a block diagram of a top cross-sectional view of the first guide member 130 of the present disclosure. It should be noted that the second guide member 132 may be formed in the same manner as the first guide member 130 illustrated in FIG. 3. The first guide member 130 may include a first portion 142, a second portion 146, a third portion 148, and a fourth portion 138 (also referred to as the flange 138). The first portion 142, the second portion 146, the third portion 148, and the fourth portion 138 may be formed as a single piece. For example, a single piece of steel or metal can be machined, brake pressed, formed, and the like, to form the bends and angles illustrated in FIG. 3.

Suitable steel or metal may be selected to be 10-16 gauge (such as 10-14 gauge, such as 12 gauge) steel hot rolled commercial quality sheet (CS) carbon steel, such as such as ASTM A1011 CS, such as Type B sheet, or 10-16 gauge (such as 10-14 gauge, such as 12 gauge) stainless steel, such as ASTM A666, such as Type 304, or any other suitably durable and corrosion resistant material.

In an example, the first portion 142 may include the openings 134. The first portion 142 of the first guide member 130 may be overlapped with the first portion of the second guide member 132 such that the respective openings 134 are aligned. A fastener may then be fitted through the openings 134 to couple the first guide member 130 and the second guide member 132 together to form the guide assembly 118.

The second portion 146 may receive a fastener to couple the guide assembly 118 to a wall. A bend 144 may be formed between the first portion 142 and the second portion 146. The bend 144 may be approximately 90 degrees.

The third portion 148 may include a fold 150 that is bent or folded against the second portion 146. For example, the third portion 148 may be folded internally (e.g., towards the first portion 142 and inside of the guide assembly 118. The third portion 140 may be folded at an angle 156 relative to the second portion 146. The angle 156 may be approximately 180 degrees.

As discussed in further detail below, the fold 150 may store a large amount of internal stress. As a result, during a fire, the first guide member 130 may be heated. The heat may allow the fold 150 to be released due to the internal stress, and the third portion 148 may move away from the second portion 146 which is secured to the wall. As the third portion 148 moves away, the fourth portion 138 may move towards the endlock 120 of the slats 104. The fourth portion of the second guide member 132 may also move towards the endlock 120 of the slats 104. As a result, a greater constraining force may be applied to the endlocks 120 to hold the slats 104 within the guide assembly 118 and prevent the fire shutter 102 from opening or blowing out of the guide assembly 118 during a fire. The same feature also provides a similar benefit during extreme wind load forces on the fire shutter, especially when the guides have a relatively narrower width.

Figure 5:
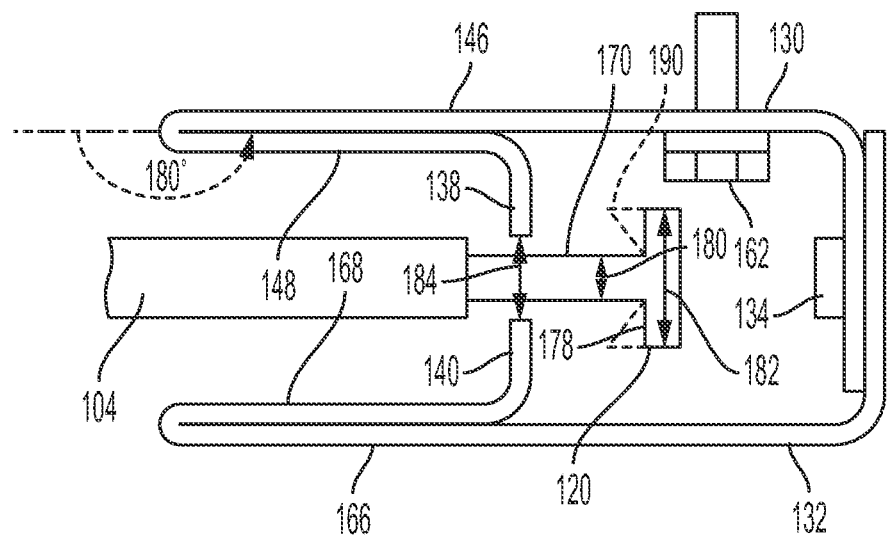
FIG. 5 is a block diagram of a top cross-sectional view of the guide assembly of the present disclosure with an endlock positioned within the guide assembly.
Figure 6:
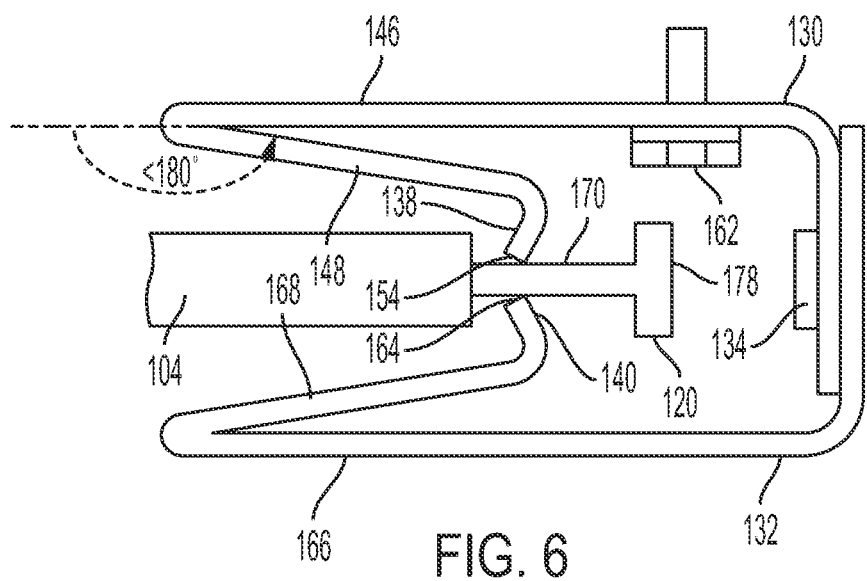
FIG. 6 is a top cross-sectional view of the guide assembly of the present disclosure with the endlock positioned within the guide assembly under heat from a fire or extreme wind loads acting on the fire shutter.

As noted above, previous guide assembly designs used a single 90-degree bend without having the 180-degree bend or fold in the guide member 130 of the present disclosure. The use of a 180-degree bend or fold uses deformation strain to provide retention of the slat endlocks within the guide assembly. Thus, the constraining force is increased relative to previous guide assembly designs, which allows for more thermal or wind forces to be exerted against the fire shutter curtain when it is in a closed position. A more detailed example of how the third portion 146 moves is illustrated in FIGS. 5 and 6 and discussed in further detail below.

A bend 158 may be formed between the third portion 148 and the fourth portion 138. The bend 158 may be approximately 90 degrees. Thus, the first portion 142 and the fourth portion 138 may be bent to be substantially parallel to one another.

FIG. 4 illustrates a block diagram of a top cross-sectional view of the guide assembly 118 of the present disclosure. The guide assembly 118 may include the first guide member 130 and the second guide member 132, as discussed above.

FIG. 4 illustrates how a fastener 400 may be inserted through the aligned openings 134 of the first guide member 130 and the second guide member 132. The guide assembly 118 may be coupled to a wall 160 via a fastener 162. The fasteners 400 and 162 may be any types of mechanical fasteners. For example, the fasteners 400 and 162 may be bolts, screws, rivets, wall anchors, weld studs, and the like.

The internal bend between the second portion 146 and the third portion 148 of the first guide member 130 and the internal bend between the second portion 166 and the third portion 168 of the second guide member 132 may allow the guide assembly 118 to have a smaller footprint. For example, the overall width (e.g. as measured from left to right on the page) of the guide assembly 118 may be reduced. This may allow the guide assembly 118 to consume less space of an opening where the fire shutter assembly 100 is deployed. However, the guide assembly 118 of the present disclosure may still provide sufficient force against the endlocks 120 to keep the fire shutter door 102 within the guide assembly during a fire or extreme wind loads.

FIG. 4 illustrates the gap 136 formed by the flange 138 of the first guide member 130 and the flange 140 of the second guide member 132. The flange 140 may be bent at approximately 90 degrees relative to a third portion 168 of the second guide member 132. An end 154 of the flange 138 may face an end 164 of the flange 140. The gap 136 may be formed between the ends 154 and 164. The width of the gap 136 may be sized based on dimensions of the endlock 120, as illustrated in FIGS. 5 and 6 and discussed below.

As noted above, when the first guide member 130 is heated during a fire, the third portion 148 may move away from the second portion 146. Similarly, when the second guide member 132 is heated, a third portion 168 may move away from a second portion 166 of the second guide member 132. Thus, the flange 138 and the flange 140 may begin to move closer to each other to reduce a width of the gap 136. The internal stress stored in the internal bends (e.g., between the second portion 146 and the third portion 148 and between the second portion 166 and the third portion 168) may be released when exposed to elevated temperatures (such as during a fire event) to cause the flange 138 and the flange 140 to apply a constraining or a clamping force on the endlock 120.

In addition, unlike previous guide assembly designs, the guide assembly 118 provides two points of contact against the endlock 120. For example, the two points of contact may be the ends 154 and 164. Moreover, both ends 154 and 164 apply a clamping force against the endlock 120 to provide greater strength and stability to the slats 104, and thereby, the fire shutter 102 during a fire.

FIG. 5 illustrates a block diagram of a top cross-sectional view of the guide assembly 118 with an endlock 120 positioned within the guide assembly 118 before a fire occurs. In an example, the endlock 120 of a slat 104 may be fitted through the gap 136. The endlock 120 may have a body portion 170 and an endcap 178. The body portion 170 may move up and down (e.g., into the page and out of the page) to open and close the fire shutter 102.

In an example, a width or diameter 182 of the endcap 178 may be larger than a width or diameter 180 of the body portion 170. The width or diameter 182 of the endcap 178 may be larger than a width 184 of the gap 136. The width or diameter 180 of the body portion 170 may be smaller than the width 184 of the gap 136. As a result, the body portion 170 may fit within the gap 136. In addition, the endcap 178 may prevent the endlock 120 from passing back through the gap 136 and falling out of the guide assembly 118.

Although FIG. 5 illustrates the endcap 178 having a cylindrical surface, it should be noted that the endcap 178 may have other shapes. For example, the endcap 178 may be crowned to add more clamping load. For example, the bottom side of the endcap 178 (e.g., the side facing the first guide member flange 138 and the second guide member flange 140) may have an angled outer perimeter. For example, a cross-section of the endcap 178 may appear to have triangular shaped points on the bottom side of the endcap 178. An example of the crowned shape is illustrated as dashed lines 190.

In addition, the flanges 138 and 140 may be bent to angles greater than 90 degrees to match the angle of the crown shape shown by the dashed lines 190. Thus, the surfaces of the flanges 138 and 140 may rest against the surfaces of the crown of the endcap 178 to provide a greater clamping load.

When no fire is present, the third portion 148 of the first guide member 130 may be folded internally relative to the guide assembly 118 and located adjacent to the second portion 146. The third portion 148 may be located against the second portion 146 such that the surfaces are touching. For example, the third portion 148 may be bent at approximately 180-degrees relative to the second portion 146, as illustrated in FIG. 5. Alternatively, the third portion 148 may be located near the second portion 146, but not touching. The third portion 168 of the second guide member 132 may be similarly folded or bent against the second portion 166.

As noted above, the internal or 180-degree bend may store a large amount of internal stress. When the internal stress is released, the third portion 148 of the first guide member 130 and the third portion 168 of the second guide member 132 may relax to release the internal stress that is stored. An example is illustrated in FIG. 6.

FIG. 6 illustrates a block diagram of a top cross-sectional view of the guide assembly 118 with an endlock 120 positioned within the guide assembly 118 during a fire. During a fire, the guide assembly 118 and the fire shutter door 102 may be exposed to large amounts of heat and pressure. The fire shutter assembly 100 may be designed to ensure that the fire shutter 102 remains closed and secured within the guide assembly 118 during a fire.

As noted above, during a fire, the fire shutter 102 may be automatically closed or shut to try to compartmentalize the fire. Heat from the fire may release the internal stress stored in the 180 degree bend between the second portion 146 and the third portion 148 of the first guide member 130. Similarly, the internal stress stored in the 180 degree bend between the second portion 166 and the third portion 168 of the second guide member 132 may also be released.

As shown in FIG. 6, as the third portion 148 relaxes or moves away from the second portion 146, the angle in the bend may become less than 180 degrees. Similarly, as the third portion 168 moves away from the second portion 166, the angle in the bend may become less than 180 degrees. As the third portion 148 and the third portion 168 move away from the second portion 146 and the second portion 166, respectively, the ends 154 and 164 may move towards the body 170 of the endlock 120.

The movement of the third portions 148 and 168 may reduce a width 184 of the gap 136. Said another way, the movement of the third portions 148 and 168 may constrict the gap 136 during a fire or under thermal loads.

The ends 154 and 164 may apply an opposing force against the body 170 of the endlock 120. For example, the end 154 may apply a clamping force in a first direction and the end 164 may apply a clamping force in a second direction. The first direction may be opposite the second direction. Thus, the design of the guide assembly 118 may provide two points of contact against the endlock 120 to prevent the endlock 120 from falling out of the guide assembly 118 under extreme heat and pressure.

After the fire drop is over (e.g., testing), the fire shutter door 102 can be reopened and reset for manual operation by disengaging the clutch assembly 112 from the adjusting wheel 108. After a fire event wherein the internal bends are relaxed to constrain the fire shutter door 102, the guide assembly 118 may be replaced.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A guide assembly, comprising:
 a first guide member, comprising:
  a first portion to receive a first fastener to couple the first portion to a second guide member to form the guide assembly having a gap, wherein an endlock of a fire shutter is positioned within the gap;
  a second portion to receive a second fastener to couple the first guide member to a wall;
  a third portion folded internally against the second portion; and
  a fourth portion bent at 90-degrees or greater to the third portion such that an end of the fourth portion faces the gap and the first portion and the fourth portion are parallel, wherein the first portion, the second portion, the third portion, and the fourth portion are formed from a single piece of metal.

2. The guide assembly of claim 1, wherein the third portion is folded against the second portion with a 180-degree bend between the second portion and the third portion.

3. The guide assembly of claim 2, wherein an angle of the 180-degree bend decreases as the first guide member is heated.

4. The guide assembly of claim 1, wherein the third portion moves away from the second portion as the first guide member is heated.

5. The guide assembly of claim 1, wherein the first portion is bent at 90-degrees relative to the second portion.

6. The guide assembly of claim 1, wherein the second guide member comprises:
 a respective first portion to receive the first fastener;
 a respective second portion bent at 90-degrees from the respective first portion;
 a respective third portion folded internally against the respective second portion; and
 a respective fourth portion bent at 90-degrees or greater to the respective third portion such that an end of the fourth portion of first guide member faces an end of the respective fourth portion of the second guide member to form the gap and the respective first portion and the respective fourth portion are parallel, wherein the respective first portion, the respective second portion, the respective third portion, and the respective fourth portion are formed from a single respective piece of metal.

7. A guide assembly, comprising:
 a first guide member, wherein the first guide member comprises:
  a first guide member end that comprises an internal fold; and
  a first guide member flange bent at 90-degrees or greater to the first guide member end; and
 a second guide member, wherein the second guide member comprises;
  a second guide member end that comprises an internal fold; and
  a second guide member flange bent at 90-degrees or greater to the second guide member end, wherein the first guide member is coupled to the second guide member such that an end the first guide member flange faces an end of the second guide member flange.

8. The guide assembly of claim 7, wherein the internal fold of the first guide member and the internal fold of the second guide member are 180-degrees.

9. The guide assembly of claim 7, wherein the internal fold of the first guide member and the internal fold of the second guide member are relaxed when heated.

10. The guide assembly of claim 9, wherein the first guide member flange moves towards the second guide member flange when the internal fold of the first guide member and the internal fold of the second guide member are relaxed.

11. The guide assembly of claim 10, wherein the end of the first guide member flange and the end of the second guide member flange constrict against an endlock of a fire shutter when the internal fold of the first guide member and the internal fold of the second guide member are relaxed.

12. The guide assembly of claim 7, wherein the internal fold of the first guide member and the internal fold of the second guide member each comprise;
 a respective first planar portion; and
 a respective second planar portion that is folded internally against the respective first planar portion.

13. The guide assembly of claim 7, wherein a gap is formed between the first guide member flange and the second guide member flange to receive an endlock of a fire shutter.

14. A fire shutter assembly, comprising:
 a fire shutter, wherein the fire shutter comprises a plurality of slats, wherein each one of the plurality of slats comprises an endlock on each opposite end of each slat; and
 a guide assembly, wherein the endlock on each opposite end of each slat is positioned within the guide assembly, wherein the guide assembly comprises:
  a first guide member, wherein the first guide member comprises:
   a first guide member end comprising an internal fold; and
   a first guide member flange bent at 90-degrees or greater to the first guide member end; and
  a second guide member, wherein the second guide member comprises;
   a second guide member end comprising an internal fold; and
   a second guide member flange bent at 90-degrees or greater to the second guide member end, wherein an end of the first guide member flange and faces an end of the second guide member flange form a gap to receive the endlock.

15. The fire shutter assembly of claim 14, wherein the endlock comprises a body portion and an end cap, wherein the end cap is larger than the body portion and larger than the gap.

16. The fire shutter assembly of claim 14, wherein the internal fold of the first guide member and the internal fold of the second guide member are 180-degrees.

17. The fire shutter assembly of claim 14, wherein the internal fold of the first guide member and the internal fold of the second guide member are relaxed when heated.

18. The fire shutter assembly of claim 17, wherein the first guide member flange moves towards the second guide member flange when the internal fold of the first guide member and the internal fold of the second guide member are relaxed.

19. The fire shutter assembly of claim 18, wherein the first guide member flange and the second guide member flange constrict against the endlock when the internal fold of the first guide member and the internal fold of the second guide member are relaxed.

\* \* \* \* \*